ELECTRONIC SWITCH FOR USE IN A SWEEP RECOVERY CIRCUIT

Original Filed April 15, 1958 2 Sheets--Sheet 1

INVENTOR.
RICHARD N. CLOSE
BY Wade Koontz
ATTORNEY
and
Richard J. Killoren
AGENT

ELECTRONIC SWITCH FOR USE IN A SWEEP RECOVERY CIRCUIT

Original Filed April 15, 1958 2 Sheets--Sheet 2

INVENTOR.
RICHARD N. CLOSE
BY Wade Koontz
ATTORNEY
Richard J. Killoren
AGENT

United States Patent Office 2,994,824
Patented Aug. 1, 1961

2,994,824
ELECTRONIC SWITCH FOR USE IN A SWEEP RECOVERY CIRCUIT

Richard N. Close, Garden City, N.Y., assignor to the United States of America as represented by the Secretary of the Air Force Original application Apr. 15, 1958, Ser. No. 728,752. Divided and this application May 18, 1960, Ser. No. 30,409
3 Claims. (Cl. 328—81)

This is a divisional application of the application of Richard N. Close, Serial Number 728,752, filed April 15, 1958.

This invention relates to an electronic switch for use in a sweep recovery circuit for a plan position indicator.

One object of the invention is to provide an electronic switch for use in a sweep recovery circuit which is capable of selectively passing current in either direction.

This and other objects will be more fully understood from the following detailed description taken with the drawing wherein:

FIG. 3 is a circuit schematic for the integrating amplifier used in the device of FIG. 1.

The *x* and *y* components of a rotating sweep are produced in *x* and *y* integrating amplifiers by applying charging currents thereto which are proportional to the sine and cosine of the antenna azimuth angle. The integrators have their outputs restored to a reference potential during the sweep recovery time by the action of an electronically switched feedback circuit.

Since the circuits for the *x* and *y* sweeps are identical, only the circuit for the *x* sweep will be shown and described.

Figure 2:
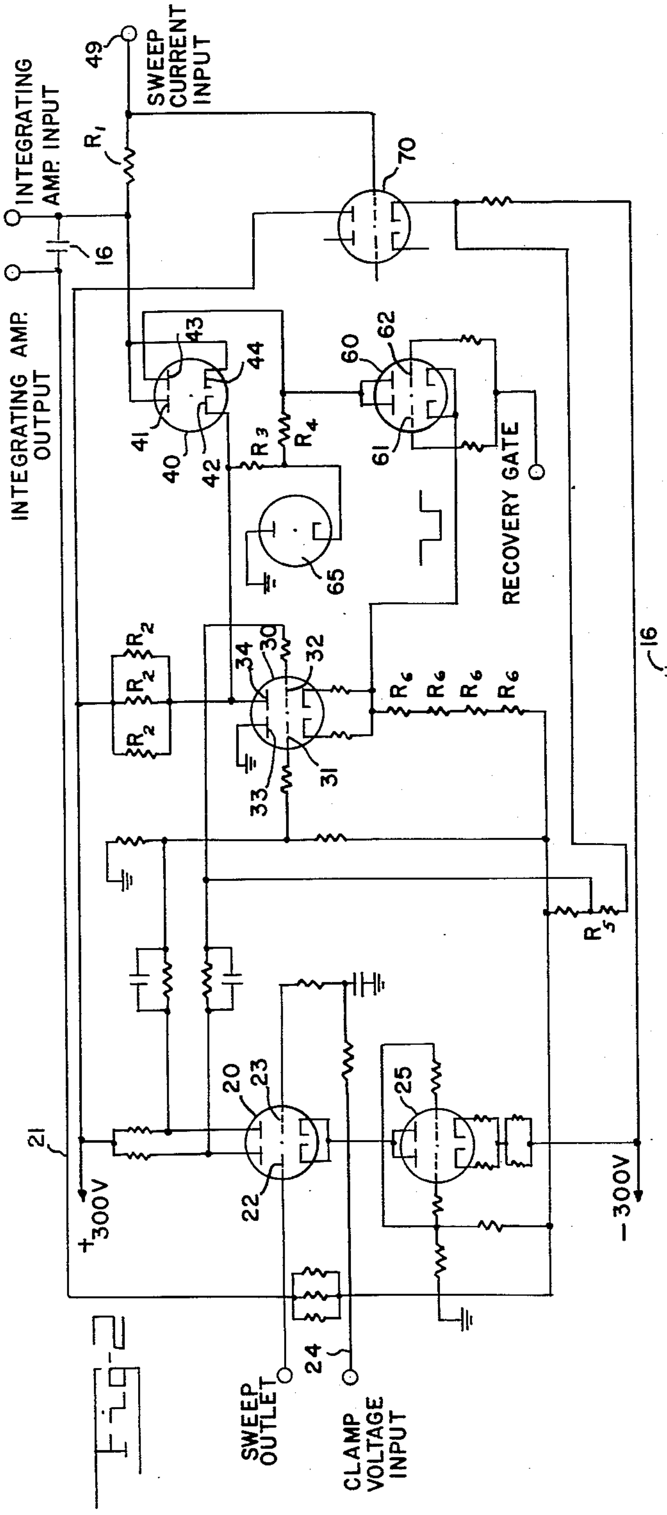
FIG. 2 is a circuit schematic for the sweep recovery circuit of FIG. 1.
Figure 1:
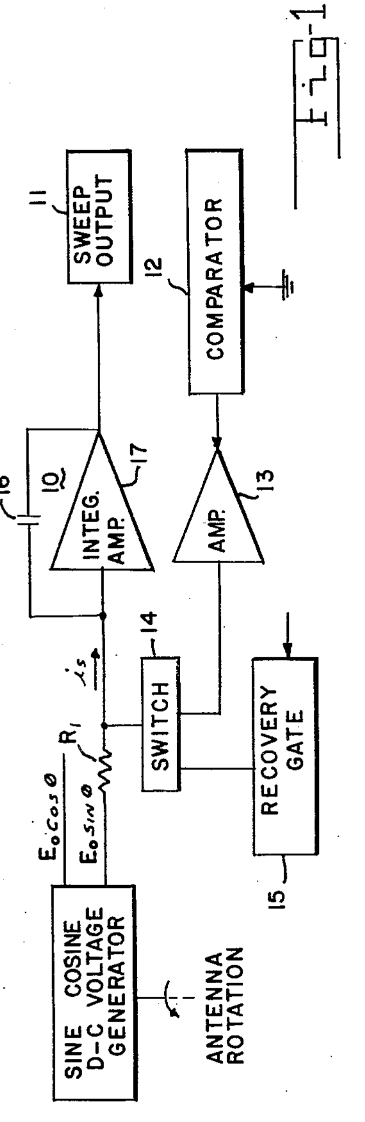
FIG. 1 is a block diagram of a sweep recovery circuit in which the electronic switch of the invention can be used.
Figure 2:
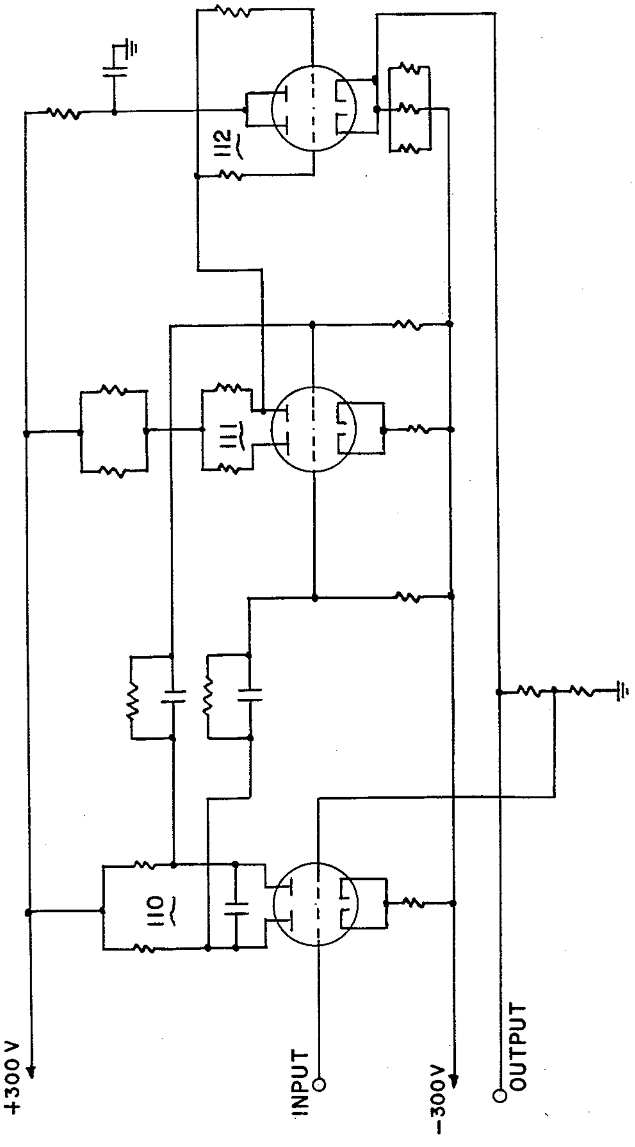

Referring now to FIG. 1 of the drawing, a resolved and rectified voltage proportional to the sine of the antenna rotational angle $\theta$ is applied to the charging resistor $R_1$ and causes a current $i_s$ to flow continuously to the input of the integrating circuit 10. The output voltage of the integrating circuit must be returned to the starting reference voltage at the end of each sweep in readiness for the next trigger. The output of the integrating circuit 10 is fed to a sweep output circuit 11 and also to the comparator 12 wherein the output is compared with the reference voltage shown as ground in this case. When off-centering is used, the reference voltage is the off-center voltage. If these two voltages differ, a current is fed through amplifier 13 and the electronic switch 14 to the input of the integrating capacitor in the integrating circuit 10. Switch 14 is closed only during the sweep recovery time by a signal from the recovery gate 15. The recovery gate signal is a positive going signal which is initiated by the end of the sweep and is terminated by the system trigger. The operation of the switch feedback circuit will be explained more fully in connection with the circuit of FIG. 2.

The output of the integrating circuit is fed to comparator tube 20 over line 21. The sweep output voltage applied to grid 22 of tube 20 must be held equal to the reference voltage applied to grid 23 over lead 24. If these two voltages differ, current is fed through amplifier 30 and the double diode 40 into the input of the integrating capacitor 16. This current discharges the integrating capacitor so that the sweep output equals the D.C. reference voltage. The sweep output signal and the D.C. reference voltage are applied to the grids of differential amplifier 20. Because of the constant current action of the cathode load, tube 25, the voltage on the plates of tube 20 are dependent almost entirely on the difference between the two grid voltages rather than on the magnitude of these applied voltages. The total plate current of tube 20 will not change appreciably with large changes in the voltages applied to grids 22 and 23. A difference in the input voltages, however, causes a difference in the plate voltages of tubes 20 and, in turn, a difference in the grid voltages of tube 30 which is a second differential amplifier. Tube 30 converts this voltage difference into a recovery current that is fed to the integrating capacitor 16 with the polarity of the current depending upon the polarity of the voltage difference.

At the recovery time, a recovery gate signal is applied to the grids of switching tube 60 thereby cutting off this tube. When tube 60 is cut off, tube 30 starts to conduct because of the common cathode load $R_6$ for these two tubes. If the signals applied to grids 31 and 32 are balanced, equal current will flow in the two portions of this tube thereby making the plate current in the right hand half of the tube equal to the current through resistors $R_2$ and the plate voltage at 34 equal to the plate voltage at 33 and no current will flow into the integrating capacitor 16. If grid 31 is more positive than grid 32, the plate voltage of 34 will rise and integrating capacitor current will flow through resistances $R_3$ and $R_4$ and the right hand portion of tube 40. If the grid 32 is more positive than grid 31, the plate voltage of 34 will drop and integrating capacitor current will flow in the left hand portion of tube 40. The integrating capacitor current is thus, such as to make the sweep output equal to the reference voltage in readiness for the next trigger.

As in all feedback systems, the gain is definitely limited for stability purposes. To reduce any error resulting from the limited gain of the recovery circuit, an open loop signal is applied to the grid circuit of tube 30 by means of resistor $R_5$. This signal is obtained through cathode follower 70 from resistor $R_1$ in the sweep current path. This voltage is proportional to the charging current and provides a means of directly determining the amount of current that must be supplied by the recovery circuit to cancel out the effect of the charging current.

To begin a sweep, diode 40 must be back biased so that no current can flow through it. To accomplish this, the positive recovery gate is applied to tube 60 causing it to conduct and thus causing tube 30 to be cut off because of their common cathode load. When the current flows through the parallel sections of tube 60 and through resistors $R_3$ and $R_4$, the plate on tube 60 will attempt to swing very negative. The cathode of clamp diode 65, however, is never more negative than ground and the junction of resistors $R_3$ and $R_4$ is therefore at ground potential. Cathode 42 and plate 43 of tube 40 are then held at such a potential level as to keep tube 40 cut off until the end of the sweep at which time tube 60 is again cut off by the recovery gate.

The integrating amplifier 17 connected across the condenser 16 is a high gain amplifier. This amplifier may be any high gain amplifier which satisfies the conditions for use in the Miller type integrating amplifier circuit. One such amplifier is shown in FIG. 3 wherein two differential amplifiers 110 and 111 are followed by a cathode follower 112. Degenrative feedback is applied from the output of the cathode follower 112 to the input through the integrating capacitor 16. The input voltage of the integrating amplifier remains very close to the reference voltage for large changes in the output voltage. The output voltage of the integrating amplifier is therefore proportional to the charge on the integrating capacitor. The input impedance of this circuit is extremely high and the integrating capacitor can therefore discharge only very slowly. The cathode follower stage makes the output impedance of this circuit very low so that the circuit can be loaded with no appreciable change in voltage. The output voltage is changed by introducing a charge into the input of the integrating amplifier.

There is thus provided an electronic switch for use in a sweep circuit for a plan position indicator wherein the sweep integrators have their output restored to a reference potential through the electronic switch during the sweep recovery interval.

Though one specific embodiment has been described in some detail, it is obvious that numerous changes may be made without departing from the general principles and scope of the invention.

I claim:

1. An electronic switch for passing current in either direction comprising; a double diode having a first cathode-plate circuit and a second cathode-plate circuit, means for applying the input signal to the cathode of one of said cathode-plate circuits and the plate of the other cathode-plate circuit, an output circuit connected to the remaining cathode and plate in said cathode-plate circuits whereby current flow in said first cathode plate circuit is in one direction and current flow in said second cathode-plate circuit is in the other direction, with the direction of current flow being determined by the level of the input signal, a control tube having its anode connected to said second plate, a voltage dividing network connected between the anode of said control tube and said first cathode, means connected to a point on said voltage divider network for cutting off current flow in said double diode when the control tube is conducting, means for applying a signal to the grid of said control tube to cut off said control tube to thereby open said double diode for conduction.

2. An electronic switch for passing current in either direction comprising; a double diode having a first cathode-plate circuit including a first cathode and a first plate, a second cathode-plate circuit, including a second cathode and a second plate, means for applying the input signal to said first cathode and said second plate, an output circuit connected to said second cathode and said first plate whereby current flow in said first cathode plate circuit is in one direction and current flow in said second cathode-plate circuit is in the other direction with the direction of current flow being determined by the level of the input signal, a control tube having its anode connected to said second plate, a voltage dividing network connected between the anode of said control tube and said first cathode, a clamping circuit connected to a point on said voltage divider network for cutting off current flow in said double diode when the control tube is conducting, means for applying a signal to the grid of said control tube to cut off said control tube to thereby open said double diode for conduction.

3. An electronic switch for passing current in either direction comprising; a double diode having a first cathode and a first plate and a second cathode and a second plate, an input circuit connected to said first cathode and said second plate, an output circuit connected to said second cathode and said first plate, with the direction of current flow being determined by the level of the input signal, a control tube having its anode connected to said second plate, a voltage dividing network connected between the anode of said control tube and said first cathode, a clamping circuit connected to a point on said voltage divider network for cutting off current flow in said double diode when the control tube is conducting, means for applying a signal to said double diode input circuit for determining the direction of conduction of said double diode, means connected in the cathode circuit of said control tube for blocking application of said signal to said double diode when said control tube is conducting and means for applying a signal to the grid of said control tube to cut off said control tube to thereby open said double diode for conduction.

No references cited.